United States Patent
Epshteyn

(10) Patent No.: US 7,034,833 B2
(45) Date of Patent: Apr. 25, 2006

(54) ANIMATED PHOTOGRAPHS

(75) Inventor: Yevgeniy Epshteyn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 489 days.

(21) Appl. No.: 10/158,020

(22) Filed: May 29, 2002

(65) Prior Publication Data

US 2003/0222888 A1    Dec. 4, 2003

(51) Int. Cl.
*G06T 15/70* (2006.01)
(52) U.S. Cl. ...................................................... 345/473
(58) Field of Classification Search ................ 345/619, 345/473, 531, 629, 630, 632, 633, 634; 382/284, 382/302, 282, 173; 358/1.9, 2.1, 538, 539, 358/540, 450, 452, 453, 464
See application file for complete search history.

(56) References Cited

U.S. PATENT DOCUMENTS

| | | | |
|---|---|---|---|
| 5,400,081 A * | 3/1995 | Chaplin | 348/587 |
| 5,634,850 A * | 6/1997 | Kitahara et al. | 463/33 |
| 5,903,896 A * | 5/1999 | Waldman et al. | 707/200 |
| 6,121,981 A * | 9/2000 | Trower et al. | 345/473 |
| 6,227,974 B1 * | 5/2001 | Eilat et al. | 463/40 |
| 6,278,455 B1 * | 8/2001 | Baker | 715/716 |
| 6,339,429 B1 * | 1/2002 | Schug | 345/589 |
| 6,636,220 B1 * | 10/2003 | Szeliski et al. | 345/475 |
| 6,873,327 B1 * | 3/2005 | Edwards et al. | 345/473 |
| 6,927,778 B1 * | 8/2005 | Aleksic et al. | 345/592 |
| 2002/0018067 A1 * | 2/2002 | Carcia et al. | 345/473 |
| 2002/0032043 A1 * | 3/2002 | Ishikawa | 455/566 |
| 2002/0149589 A1 * | 10/2002 | Cok | 345/473 |
| 2003/0001846 A1 * | 1/2003 | Davis et al. | 345/474 |
| 2004/0147307 A1 * | 7/2004 | Joshi | 463/20 |

* cited by examiner

*Primary Examiner*—Ulka Chauhan
*Assistant Examiner*—Enrique L. Santiago
(74) *Attorney, Agent, or Firm*—Steven D. Yates

(57) ABSTRACT

A digital picture frame or other device which displays for some period of time a background image and a foreground object in a rest state. After the period of time elapses, some or all of the foreground object is temporarily animated. Thus, for example, a digital picture frame may display an image of a person who occasionally winks, smiles, waves, or performs some other action before returning to the rest state.

10 Claims, 4 Drawing Sheets

ANIMATED PHOTOGRAPHS

FIELD OF THE INVENTION

The invention generally relates to electronically stored photographs, and more particularly to electronically stored photographs that have a rest state and an occasionally active state in which some or all portions of the photograph is animated before the photograph returns to the rest state.

BACKGROUND

There exist many products that allow one to display digital images or play movies. For example, most every portable computer sold today may store image data, e.g., a digital picture or a movie, and be configured to display or play the image data on a display. Also, one may use dedicated hardware such as the Sony PHD-A55 Cyberframe™, which looks somewhat like a picture frame with a large border, and allows, like a portable computer, one to present image data on a built-in display.

BRIEF DESCRIPTION OF THE DRAWINGS

The features and advantages of the present invention will become apparent from the following detailed description of the present invention in which.

DETAILED DESCRIPTION

Figure 1:
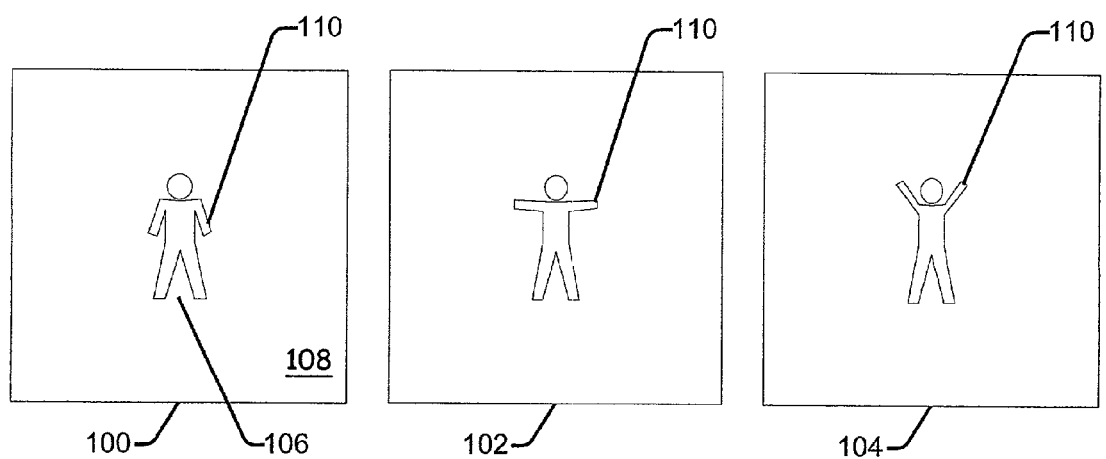
FIG. 1 illustrates several key frames having a foreground object moving on a background.

Although the prior includes devices to display a still image, or to display a movie, sometimes it may be desirable to use a semi-animated picture frame to display a still image for a certain period of time, and to occasionally animate a portion of the displayed image. Although such semi-animated picture frames have previously only been the subject of fantasy, for example, the Warner Bros. Films movie "Harry Potter" included animations of talking portraits, the present teachings of the invention disclose how to produce a semi-animated picture (or portrait) frame in reality.

As will be discussed below, an animated picture frame is constructed having a memory for storing a still image, and secondary image data describing an animation of a portion of the image. For example, there may be an image of a boy standing poised to swing a bat, and this image may be displayed in the animated frame for some time, such as 10 minutes. After this time elapses, the secondary image data may be accessed so as to cause an animation of the boy's arms, e.g., displaying the boy swinging the bat towards a ball. In one embodiment, an object to be animated (e.g., the boy who will occasionally be animated to swing a bat) is defined with a video segmentation technique.

Many different video segmentation techniques may be used. For example, a simple technique may be applied where an object to be animated is identified by first recording the background without the object to be animated (foreground object) within the scene. Then the foreground object may be recorded on the background, and a difference taken to identify the foreground object for extraction from the background.

Another segmentation technique is presented in the paper "Video Background Replacement without A Blue Screen" by Richard J. Qian and M. Ibrahim Sezan (hereafter the "Qian algorithm"). As with a simple difference-based segmentation discussed above, the Qian algorithm uses color differences between pixels in a recording of a background without the object to be animated, and a recording with the object to identify the object to be animated. The Qian algorithm computes a probability map containing likelihood values classifying whether a particular pixel of an image is in the foreground or background, where the map may be refined using anisotropic diffusion to reduce classification errors. Based on the probability map, the object to be animated can be identified and then separated from the background. Further segmentation information may also be found at Intel Corporation's Internet site for open source computer vision library at www.intel.com-research-mrl-research-opencv-overview.htm. (Please note, to prevent inadvertent hyperlinks, the forward slashes in the preceding Uniform Resource Locator (URL) were replaced with hyphens).

Regardless of the segmentation technique used, once the object to be animated is separated, it may be separately encoded from the background, and used to synthesize new video by merging it with different (or generated) backgrounds. In one embodiment, a still image, secondary image data, and alternative backgrounds on which to display the foreground object and animation thereof are packaged into a package that can be shared with other users of animated picture frames or other display devices. It will be appreciated that conventional peer-to-peer technologies and sharing rules may be employed to automate or otherwise facilitate sharing.

FIG. 1 illustrates several key frames 100, 102, 104 having a foreground object 106 moving on a background 108. A portion 110 of the foreground object 106 moves in the key frames. It will be appreciated that this illustration is highly simplistic, and that the illustrated key frames would have many intermediate frames to smooth animation. Also, although only a single portion of the foreground object is illustrated as moving, any animation may be performed, such a animating multiple portions of an object. Thus, for example, if the object to be animated were a person, then the person may be animated to occasionally wink an eye, wave, etc.

Figure 2:
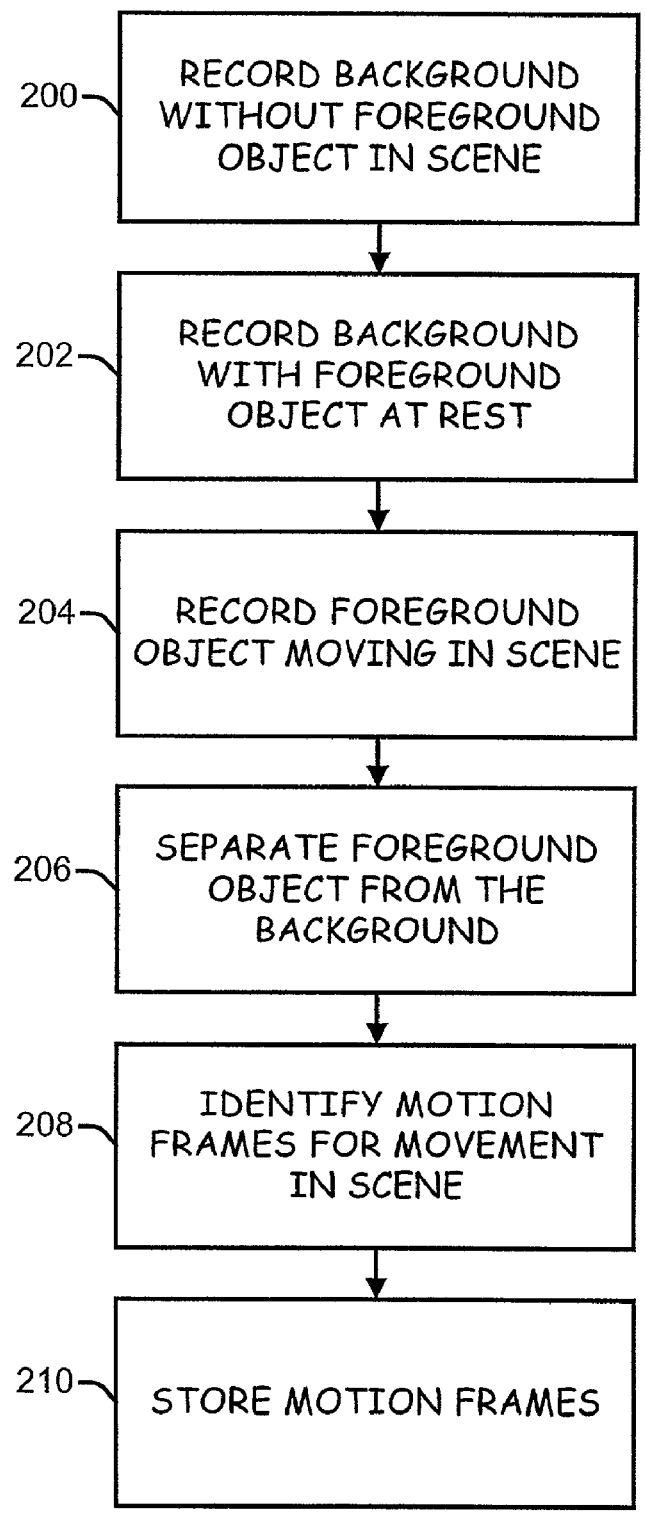
FIG. 2 illustrates exemplary operations for segmenting the foreground object from the background.

FIG. 2 illustrates exemplary operations for segmenting the foreground object from the background. A first operation is to record 200 the background image without the object to be animated (the foreground object) in the scene. Then the foreground object is recorded 202 while in the scene. The foreground object is recorded at rest, which becomes the default foreground image displayed most of the time. Then, the foreground object is recorded 204 performing some action or actions that will be used to occasionally animate the default foreground image.

For example, after recording the default foreground image for a person, the person may be recorded winking, waving, smiling, swinging a bat, or taking some other action. The foreground object is separated 206 by segmentation from the background. As understood by one skilled in the art, the result from segmentation is segmentation data corresponding to the foreground object with no background.

The foreground object may be recorded 202 with a high-resolution digital camera or other device capable of taking a high quality still digital image. Such a high-resolution recording would be desirable since most of the time this image will be displayed. Motion of the foreground object may be separately recorded 204 with a digital recorder, such as a conventional digital video camera, professional recorder, or some other recording device. The motion may be recorded at an inferior quality with respect to the foreground object. All recordings may be made with a single device, and it will be appreciated various configurations may be used depending on the nature of the recording devices and the scene(s) to be recorded.

Depending on the segmentation technique used to separate 206 the foreground object from the background, the segmentation data may be analyzed 208 to identify particular motion frames that correspond the action to be animated. Note that depending on the segmentation technique used, operation 208 may be part of the segmentation process. The motion frames are stored 210, such as in a memory communicatively coupled to a display environment, e.g. a digital picture frame. In one embodiment, motion frames are defined as differential data over previous foreground object frames. In one embodiment, like Moving Picture Experts Group (MPEG) encoding, motion frames may be stored as error compensation over predicted frame content. In one embodiment, motion frame data is compressed and stored 210.

In one embodiment, an animation is analyzed to identify archetypes of common shapes, body parts, tools, etc. As used herein, an archetype is a generic representation, such as an avatar, for shapes or objects within a scene that can be used to reproduce objects and their motion without having to encode the actual image data for the object motion. In one embodiment, movement of an archetype can be prerecorded, with certain points of interest, e.g., position of eyes, movement of parts of mouth, etc., tracked during the movement to facilitate later rendering with specific features from an image. When an archetype is recognized, rather than storing image data, instead motion information for the archetype is stored 210 along with surface attributes to be mapped on to the archetype when rendering the archetype.

For example, if an animation is a winking eye, instead of recording image frames for the eye wink, instead an eye wink archetype may be used, where appropriate eye coloration is recorded for later mapping onto the archetype when rendering. In a display environment having a memory storing archetypes, an animation may be defined simply with respect to a particular needed archetype, its surface characteristics, and motion parameters. Or, for example, if an animation is a smile, corresponding mouth features from an image may be mapped onto an avatar which is can be animated according to the archetype pre-recorded movement.

Thus, the foreground object is separated 206 from the background and stored 210 in a volatile or nonvolatile memory. The foreground object may be stored in the same or a different memory as that used to store the recorded 200 background, and both of these memories may be different from the memory used for displaying images. For example, different memory may be required, for example, if a display device has Read Only Memory (ROM) storing sample backgrounds onto which may be projected the recorded foreground object and its animation. It will be appreciated that various memory configurations may be used depending on the functionality desired for a particular display environment.

Figure 3:
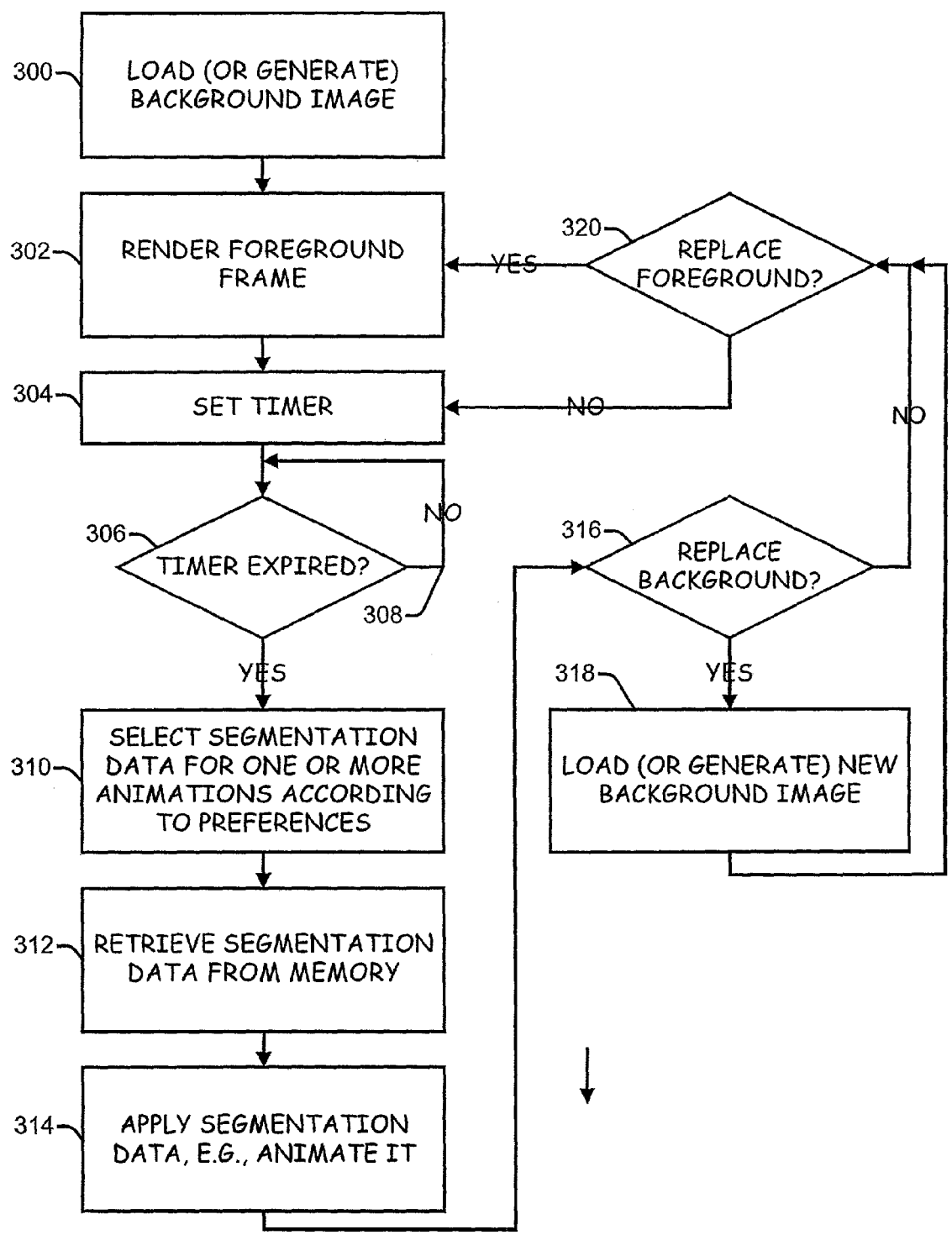
FIG. 3 illustrates an exemplary flowchart for presenting an occasionally animated image.

FIG. 3 illustrates an exemplary flowchart for presenting an occasionally animated image. A first operation is to load 300 a background image into a display device, e.g., a digital picture frame or other out put device, onto which is rendered 302 a default foreground frame, e.g., the recorded 202 (FIG. 2) foreground object at rest. A timer is set 304 for a certain period of time, e.g., 10 minutes. The time may be randomly set. A test 306 is performed to check whether the timer has expired. If not, processing loops 308. If so, segmentation data for an animation is selected 310. If there are multiple stored animation sequences, then one or more of the animations are selected according to preference, e.g., user preference for random selection, application of all animations, or some other selection criteria.

The selected segmentation data is retrieved 312 from memory and applied 314 in a conventional manner to the default foreground frame to cause its animation. When applied, the default foreground object moves as recorded 204 (FIG. 2). As discussed above, archetypes may be used and rendered into an animation sequence, where the archetype is rendered with surface characteristics as initially recorded. In the illustrated embodiment, after performing the animation, a test 316 is performed to determine whether to replace the background image. If so, then a new image is loaded 318 or generated. A test 320 may also be performed to determine whether to replace the foreground image. For example, one might want to display a particular series of foreground images on the same or changing backgrounds. In one embodiment, multiple foreground images may be packaged together for a display environment, and different animation sequences may be associated with certain foreground images. If the foreground image is not to be replaced, then processing continues with resetting 304 the timer for another period of inactivity for displaying the default foreground frame. If the foreground image is to be replaced, then processing continues with rendering 302 the new foreground frame.

Figure 4:
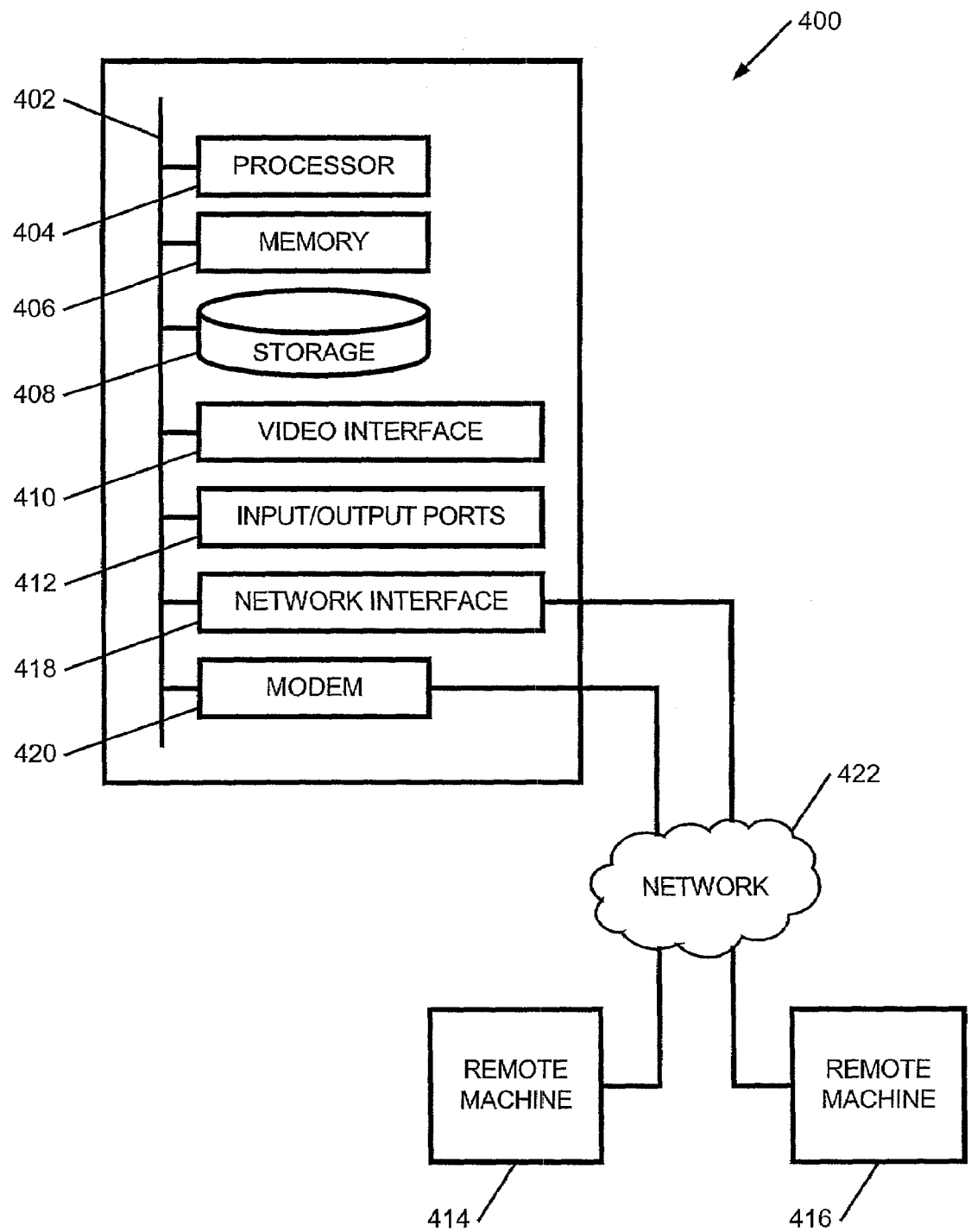
FIG. 4 illustrates a suitable computing environment in which certain aspects of the invention may be implemented.

FIG. 4 and the following discussion are intended to provide a brief, general description of a suitable computing environment in which certain aspects of the illustrated invention may be implemented. For example, the illustrated environment includes a machine 400 which may embody a digital picture frame for displaying a default foreground image and occasional animation as discussed above for FIG. 3. As used herein, the term "machine" includes a single machine, such as a computer, handheld device, etc., or a system of communicatively coupled machines or devices to allow functionality of the digital picture frame to be performed externally to the frame.

Typically, the machine 400 includes a system bus 402 to which is attached processors 404, a memory 406 (e.g., random access memory (RAM), read-only memory (ROM), flash memory, or other volatile or non-volatile state preserving medium), storage devices 408, e.g., removable or fixed "mass storage" such as hard disks, a video interface 410 which may comprise a connector for an attachable display, or include a display such as a liquid crystal display (LCD), thin film transistor (TFT) display, cathode ray tube (CRT), or other display medium. The machine may also have input/output interface ports 412 to allow receiving image data to be displayed, updating or programming the machine, or performing other operations. The machine may be controlled, at least in part, by input from conventional input devices, such as keyboards, mice, joysticks, as well as directives received from another machine, interaction with a virtual reality (VR) environment, biometric feedback, or other input source or signal. As discussed with respect to this figure, the machine may be packaged as a digital picture frame, or it may be packaged in another format.

The machine may also include embedded controllers, such as Generic or Programmable Logic Devices or Arrays, Application Specific Integrated Circuits, single-chip computers, smart cards, or the like. The machine may operate in a networked environment using physical and/or logical connections to one or more remote machines 414, 416 through a network interface 418, modem 420, or other data pathway. Machines may be interconnected by way of a wired or wireless network 422, such as a home intranet, the Internet, or other local or wide area network. It will be appreciated that network 422 may utilize various short range or long range wired or wireless carriers, including cellular, cable, laser, satellite, microwave, Bluetooth, optical, and infrared. Remote machines 414,416 may be other display frames communicating so as to coordinate displayed data, or a remote machine may be a computing device, such as a home computer, used to configure the machine. It will be appreciated that remote machines 414, 416 may be configured like machine 400, and therefore include many or all of the elements discussed for machine.

The invention may be described by reference to or in conjunction with program modules, including functions, procedures, data structures, application programs, etc. for performing tasks, or defining abstract data types or low-level hardware contexts. Program modules may be stored in memory 406 and/or storage devices 408 and associated storage media, e.g., hard-drives, floppy-disks, optical storage, magnetic cassettes, tapes, flash memory cards, memory sticks, digital video disks, biological storage. Program modules may be delivered over transmission environments, including network 422, in the form of packets, serial data, parallel data, propagated signals, etc. Program modules may be used in a compressed or encrypted format, and may be used in a distributed environment and stored in local and/or remote memory, for access by single and multi-processor machines, portable computers, handheld devices, e.g., Personal Digital Assistants (PDAs), cellular telephones, etc.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for displaying a foreground object determined at least in part by recording an original background with and without the foreground object to facilitate separating the foreground object from the original background, the method comprising:
   displaying a first photograph in a picture frame for a first length of time, the photograph comprising the foreground object displayed on a first background different from the original background;
   animating a sub-portion of the foreground object for a second length of time; and
   displaying a second photograph in the picture frame for a third length of time, the second photograph comprising the foreground object displayed on the first background;
   displaying a third photograph in the picture frame, the third photograph comprising a second foreground object displayed on the first background; and animating a sub-portion of the second foreground object.

2. The method of claim 1, further comprising:
   displaying the third photograph after displaying the first photograph and before displaying the second photograph.

3. The method of claim 1, further comprising:
   representing a region of the photograph with an archetype onto which is rendered some or all of the foreground object; and
   animating the archetype when animating the portion of the foreground object.

4. The method of claim 1, wherein the second photograph comprises a second background different from the first background.

5. The method of claim 1, wherein the second photograph comprises a second background different from both the first background and the original background.

6. The method of claim 1, further comprising:
   selecting one of a series of background images to display along with the foreground object after the animation of the portion of the foreground object.

7. The method of claim 1, further comprising: providing a database for storing at least a collection of backgrounds on which at least the foreground object may be displayed, the collection including the original background, the first background, and a second background; and said displaying the second photograph in the picture frame comprising displaying the foreground object on the second background.

8. An article, comprising:
   a machine-accessible media having associated data, for displaying a foreground object determined at least in part by recording an original background with and without the foreground object to facilitate separating the foreground object from the original when accessed by a machine, results in the machine performing:
   displaying a first photograph in a picture frame for a first length of time, the photograph comprising the foreground object rendered on a first background different from the original background;
   animating a sub-portion of the foreground object for a second length of time; and
   displaying a second photograph in the picture frame for a third length of time, the second photograph comprising the foreground object displayed on the first background; displaying a third photograph in the picture frame, the third photograph comprising a second foreground object displayed on the first background; and animating a sub-portion of the second foreground object.

9. The article of claim 8 wherein the machine-accessible media further includes data, when accessed by the machine, results in the machine performing:
   representing a region of the photograph with an archetype onto which is rendered some or all of the foreground object; and
   animating the archetype when animating the portion of the foreground object.

10. The article of claim 8 wherein the machine-accessible media further includes data, when accessed by the machine, results in the machine performing:
    selecting one of a series of background images to display along with the foreground object after the animation of the portion of the foreground object.

* * * * *

UNITED STATES PATENT AND TRADEMARK OFFICE
CERTIFICATE OF CORRECTION

PATENT NO. : 7,034,833 B2  Page 1 of 1
APPLICATION NO. : 10/158020
DATED : April 25, 2006
INVENTOR(S) : Epshteyn It is certified that error appears in the above-identified patent and that said Letters Patent is hereby corrected as shown below:

In column 6, at line 33, after "original" insert --background, wherein the data, --.
In column 6, at line 37, delete "rendered" and insert --displayed--.

Signed and Sealed this

Thirtieth Day of October, 2007

JON W. DUDAS
*Director of the United States Patent and Trademark Office*